(12) United States Patent
Corkill et al.

(10) Patent No.: US 12,728,399 B2
(45) Date of Patent: Sep. 8, 2026

(54) DEVICE AND PROCESS FOR MASS PRODUCTION OF PARTICULATE MATERIALS

(71) Applicant: Kansas State University Research Foundation, Manhattan, KS (US)

(72) Inventors: Stephen Corkill, Olsburg, KS (US); Christopher Sorensen, Manhattan, KS (US); Justin Wright, Manhattan, KS (US); Arjun Nepal, Manhattan, KS (US); Stefan Bossmann, Manhattan, KS (US)

(73) Assignee: Kansas State University Research Foundation, Manhattan, KS (US)

( * ) Notice: Subject to any disclaimer, the term of this patent is extended or adjusted under 35 U.S.C. 154(b) by 808 days.

(21) Appl. No.: 18/001,300

(22) PCT Filed: Jun. 15, 2021

(86) PCT No.: PCT/US2021/037321
§ 371 (c)(1),
(2) Date: Dec. 9, 2022

(87) PCT Pub. No.: WO2022/015445
PCT Pub. Date: Jan. 20, 2022

(65) Prior Publication Data

US 2023/0234016 A1 Jul. 27, 2023

Related U.S. Application Data

(60) Provisional application No. 63/039,087, filed on Jun. 15, 2020.

(51) Int. Cl.
*B01J 19/08* (2006.01)
*C01B 32/184* (2017.01)

(52) U.S. Cl.
CPC .......... *B01J 19/088* (2013.01); *C01B 32/184* (2017.08); *B01J 2219/0809* (2013.01);
(Continued)

(58) Field of Classification Search
CPC ............. B01J 19/088; B01J 2219/0809; B01J 2219/0818; B01J 2219/0869;
(Continued)

(56) References Cited

U.S. PATENT DOCUMENTS 5,124,100 A * 6/1992 Nishii ...................... B29B 9/08
264/117
5,715,788 A 2/1998 Tarr et al.
(Continued)

FOREIGN PATENT DOCUMENTS

CN 1689970 A 11/2005
CN 204203183 U 3/2015
(Continued)

OTHER PUBLICATIONS

Machine Translation of CN 204203183 (Year: 2015).*
(Continued)

*Primary Examiner* — Lessanework Seifu
(74) *Attorney, Agent, or Firm* — Hovey Williams LLP

(57) ABSTRACT

Apparatus and methods are provided that are capable of mass production of particulate materials, such as graphene particulates. The apparatus comprises an ignition assembly that comprises readily interchangeable electrode cassettes and that may be configured to self-clean in between the combustion cycles in which the particulate materials are generated. Methods of generating the particulate materials require low energy inputs in order to initiate the combustion reaction, which is then self-sustaining until the reactants are depleted.

8 Claims, 7 Drawing Sheets

(52) U.S. Cl.
CPC ............................ *B01J 2219/0818* (2013.01); *B01J 2219/0869* (2013.01); *B01J 2219/0875* (2013.01)

(58) Field of Classification Search
CPC ........ B01J 2219/0875; B01J 2219/0828; B01J 2219/0841; B01J 2219/0898; B01J 2219/0843; B01J 2219/082
See application file for complete search history.

(56) References Cited

U.S. PATENT DOCUMENTS

| | | | |
|---|---|---|---|
| 6,099,696 | A | 8/2000 | Schwob et al. |
| 7,691,909 | B2 | 4/2010 | Sorensen et al. |
| 9,440,857 | B2 | 9/2016 | Sorensen et al. |
| 10,690,047 | B1 | 6/2020 | LaStella |
| 11,053,133 | B2 | 7/2021 | Xie et al. |
| 2014/0227548 | A1 | 8/2014 | Myrick |
| 2014/0335010 | A1 | 11/2014 | Sorensen et al. |
| 2015/0210558 | A1 | 7/2015 | Dickinson et al. |
| 2017/0073522 | A1 | 3/2017 | Hardman et al. |

FOREIGN PATENT DOCUMENTS

| | | | | |
|---|---|---|---|---|
| CN | 106698385 | | 5/2017 | |
| CN | 207516290 | U | 6/2018 | |
| CN | 109467075 | | 4/2020 | |
| GB | 1223162 | A * | 2/1971 | ............ H05B 7/085 |
| WO | 20151020485 | | 8/2015 | |
| WO | 2022147171 | | 7/2022 | |

OTHER PUBLICATIONS

Office Action in corresponding Chinese Patent Application Serial No. 202180042783.8, dated May 10, 2024 (English machine translation attached).

Partial Supplementary Search Report in corresponding European Patent Application Serial No. 21842880.3, dated Jun. 6, 2024.

Search Report in corresponding Malaysian Patent Application PI2022007070; dated Nov. 11, 2025.

International Search Report and Written Opinion in corresponding PCT/US2021/037321, dated Mar. 28, 2022.

Dhaubhadel, et al., "Aerosol Gelation: Synthesis of a Novel, Lightweight, High Specific Surface Area Material," Aerosol Sci. Tech., 2007, 41, pp. 804-810.

Nepal, et al., "One-step synthesis of graphene via catalyst-free gas-phase hydrocarbon detonation", Nanotechnology, 2013, 24(24) (abstract attached).

* cited by examiner 64
102
84
74
72
100
80

76
88
94
106
96
98
70
82
86
78
90
104
92
108
110

DEVICE AND PROCESS FOR MASS PRODUCTION OF PARTICULATE MATERIALS

RELATED APPLICATIONS

This application is a National Stage application under 35 U.S.C. 371 of International Patent Application No. PCT/US2021/037321, filed, Jun. 15, 2021, which claims the benefit of U.S. Provisional Patent Application No. 63/039,087, filed Jun. 15, 2020, both of which are incorporated by reference herein in their entireties.

BACKGROUND OF THE INVENTION

Field of the Invention

The present invention is generally directed toward apparatus and methods for the mass production of particulate materials, especially carbon-containing particulate materials such as graphene. The particulate materials are produced in a combustion process in which the chemical energy contained within the reactants is sufficient to sustain the reaction responsible for generating the particulate materials. In one or more embodiments, the apparatus comprises an ignition assembly that comprises a pair of electrodes, each of which is contained within a respective cassette that is removable from the ignition assembly. The ignition assembly can also be configured to be self-cleaning in between reaction cycles.

Description of the Prior Art

Graphene is a two-dimensional monolayer of $sp^2$ bonded carbon atoms in a hexagonal crystal structure. Graphene possesses several unique physical properties including excellent mechanical strength, high intrinsic carrier mobility at room temperature, and electrical and thermal conductivity comparable to the in-plane value of graphite. Thus, graphene has attracted interest for use in a number of applications including nanoelectronics and sensors, nanocomposites, batteries, supercapacitors, and hydrogen storage. However, a shortcoming that has prevented graphene from being widely adopted in these areas has been inability to produce commercial quantities of graphene in a cost-effective manner. Current graphene manufacturing processes are expensive, complicated, energy intensive, and often involve caustic chemicals and catalysts.

U.S. Pat. No. 9,440,857, which is incorporated by reference herein in its entirety, is directed toward a method of producing graphene particles in a simple, controlled detonation process by detonating a carbon-containing material and an oxidizing agent within a reaction vessel. The reaction vessel is loaded with the desired amount of reactants and a spark is used to achieve detonation of the materials. An aerosol comprising graphene particles is produced. However, the described apparatus, while well-suited for producing lab-scale quantities of graphene, was not efficient in producing commercial quantities of graphene particulates and suffered fouling of the spark generator after repeated detonation cycles.

Luong et al. have described a process for producing graphene via flash synthesis. "Gram-scale bottom-up flash graphene synthesis," Nature 577, 647-651 (2020). In flash synthesis, graphene is produced from solid carbon sources such as coal, petroleum coke, biochar and carbon black using a high-voltage electric discharged from a capacitor bank that brings the carbon source to a high temperature very quickly. While gram-scale production of graphene particles is reported, such a process is expected to be capital and energy intensive, due to the capacitor banks used for rapid heating of the carbon source.

Accordingly, a need exists in the art for apparatus and methods of producing graphene that are economical and scalable to permit production of commercial quantities of graphene particulates.

SUMMARY OF THE INVENTION

According to one embodiment of the present invention apparatus for production of particulate materials through combustion of reactants is provided. The apparatus comprises a reaction chamber, a vacuum source operably connected with the reaction chamber, and an ignition assembly. The reaction chamber is operably coupled with a source of a carbon-containing material and a source of an oxidizer. The vacuum source is operable to selectively evacuate at least a portion of the contents of the reaction chamber, especially following generation of the particulate materials. The ignition assembly is configured to initiate combustion of a quantity of the carbon-containing material and a quantity of the oxidizer delivered to the reaction chamber from their respective sources. The ignition assembly comprises a pair of electrodes that are operable to generate an ionizing arc therebetween, each electrode is contained within a respective cassette that is removably received within the ignition assembly.

According to another embodiment of the present invention, an electrical ignition assembly is provided that is operable to initiate a combustion reaction within a reaction chamber. The ignition assembly comprises a housing having an inlet port configured to be fluidly connected to one or more sources of gaseous reactant materials and an outlet port configured to be fluidly connected to the reaction chamber. The inlet port and outlet port are connected by a passage. The ignition assembly further comprises a pair of electrodes each having an electrode tip that extends into the passage. Each electrode is contained within a respective cassette that is removably received within the housing.

According to still another embodiment of the present invention, a method of producing graphene particulates is provided. The method comprises introducing into a reaction chamber a mixture comprising a carbon-containing material and an oxidizer. The carbon-containing material and oxidizer are introduced into the reaction chamber through an ignition assembly that comprises a pair of electrodes. An ionizing arc is generated between the pair of electrodes within the ignition assembly, which results in the combustion of the carbon-containing material and oxidizer and the generation of a temperature within the reaction chamber of at least 3000 K to produce an aerosol comprising graphene particulates. The aerosol is evacuated from the reaction chamber using a vacuum source that is operably connected to the reaction chamber. The graphene particulates are recovered from the aerosol evacuated from the reaction chamber as a graphene powder.

Figure 1:
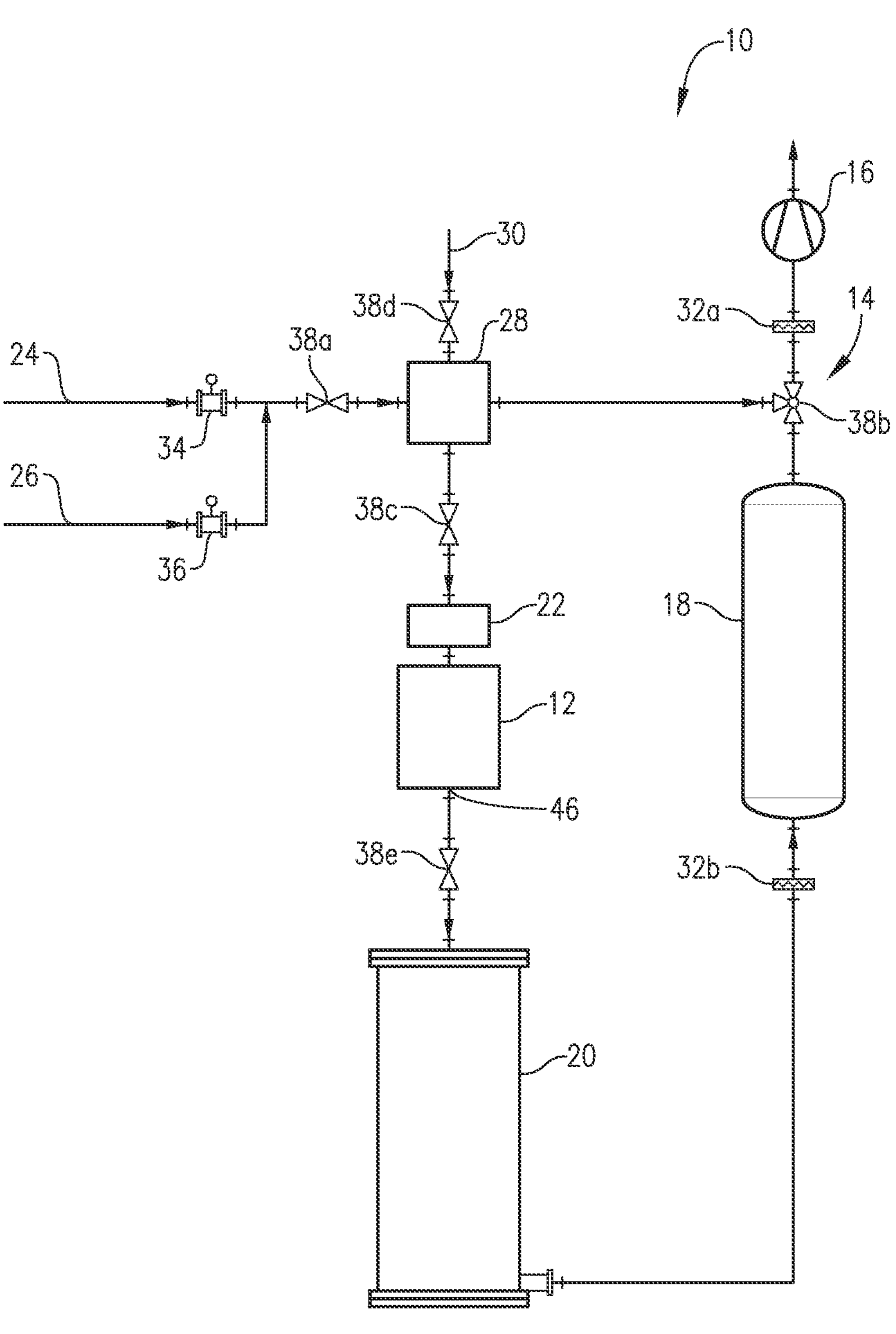
FIG. 1 is a schematic diagram of an exemplary apparatus for production of particulate materials through combustion of reactants according to one or more embodiments of the present invention.

While the drawings do not necessarily provide exact dimensions or tolerances for the illustrated components or structures, the drawings are to scale with respect to the relationships between the components of the structures illustrated in the drawings.

DETAILED DESCRIPTION OF THE PREFERRED EMBODIMENT

Turning to FIG. 1, apparatus 10 for producing particulate materials according to one or more embodiments of the present invention is depicted. Apparatus 10 generally comprises a reaction chamber 12, a vacuum system 14, which comprises a vacuum pump 16 and a vacuum ballast tank 18, a particle collector 20, and an ignition assembly 22. A source 24 of a carbon-containing material and a source 26 of an oxidizer are operably coupled to reaction chamber 12 via a gas manifold 28. In certain embodiments, a source 30 of flushing gas, such as air, may also be coupled to reaction chamber 12 via manifold 28. However, it is within the scope of the present invention for oxidizer source 26 to be used as the flushing gas rather than requiring a separate flushing gas source. The inlet of vacuum pump 16 is connected to a three-way valve 38*b*. Valve 38*b* is also connected to manifold 28 and vacuum ballast tank 18. In this manner, vacuum pump 16 can be configured to draw from reaction chamber 12 in preparation of filling of the reaction chamber with reactants or to draw from ballast tank 18 during the reaction and collection cycles to speed vacuum recovery of tank 18. A filter 32*a*, such as a HEPA filter, can be located in between pump 16 and valve 38*b* to prevent fine particulates from being drawn into the pump. In addition, a filter 32*b*, again such as a HEPA filter, can be located upstream of the ballast tank to capture any particulates that might be entrained in the gas flow coming from particle collector 20. In alternate embodiments, a second vacuum pump (not shown) may be used to continuously draw on ballast tank 18.

The mass of the carbon-containing material and oxidizer being introduced into manifold 28 can be monitored by mass meters 34, 36. It is understood that a plurality of mass meters that are operably connected to other sources of reactants may be provided in order to provide the capability of apparatus 10 to react more complex mixtures of reactants, as opposed to simple binary mixtures as shown. In addition, the flow of reactants and flushing gas into and out of manifold 28 can be controlled by a plurality of control valves 38*a-e*. The operation of valves 38 may be controlled by a central electronic controller (not shown). The central controller can also include various sensors (not shown) placed throughout apparatus 10 to monitor and record data of important process parameters to provide for quality control, traceability, documentation and mean time between failures (MTBF) monitoring.

In certain embodiments, the carbon-containing material may include, but is not limited to, carbon-rich precursors, gases, gas mixtures, powders, aerosols, and other materials. In preferred embodiments, the carbon-containing mixture comprises a hydrocarbon compound, and preferably a saturated or unsaturated C1-C12 hydrocarbon compound. In certain embodiments, acetylene is a particularly preferred hydrocarbon material. The carbon-containing material may comprise a single material or compound, or a mixture of carbon-containing compounds. For example, acetylene may be the only carbon-containing compound present in the reaction mixture, or the reaction mixture may comprise a mixture of hydrocarbon compounds. Moreover, the carbon-containing material need not be supplied as a gas. The carbon-containing mixture may comprise a solid or liquid (e.g., aerosols comprising fine solid particulates, such as coal dust or petcoke, and/or liquid droplets, such as liquid hydrocarbons) that is capable of being finely dispersed within the reaction vessel. In certain embodiments, the carbon-containing material should present as great of a surface area as possible so that the combustion reaction proceeds quickly and generates the heat necessary for achieving the desired reaction temperatures.

The oxidizer can be any material that is capable of oxidizing the carbon-containing material in a combustion reaction. In one or more embodiments, the oxidizing agent comprises oxygen, either in its elemental form or compounded with other elements. In particular embodiments, the oxidizing agent is selected from the group consisting of $O_2$, $N_2O$, NO, and mixtures thereof. When the oxidizing agent comprises $O_2$, the $O_2$ may be supplied in substantially pure form, (i.e., 99% or greater), as air, or along with other inert materials.

The ratio of oxidizer to carbon-containing material present in the reaction vessel prior to combustion can contribute to the characteristics of the graphene particles formed upon combustion of the reaction mixture. In certain embodiments, the molar ratio of oxidizer to carbon-containing material is about 1.5 or less. In particular embodiments, the ratio of oxidizer to carbon-containing material is from about 0.1 to about 1.5, from about 0.2 to about 1.2, from about 0.4 to about 1.0, or from about 0.6 to about 0.8.

Figure 2:
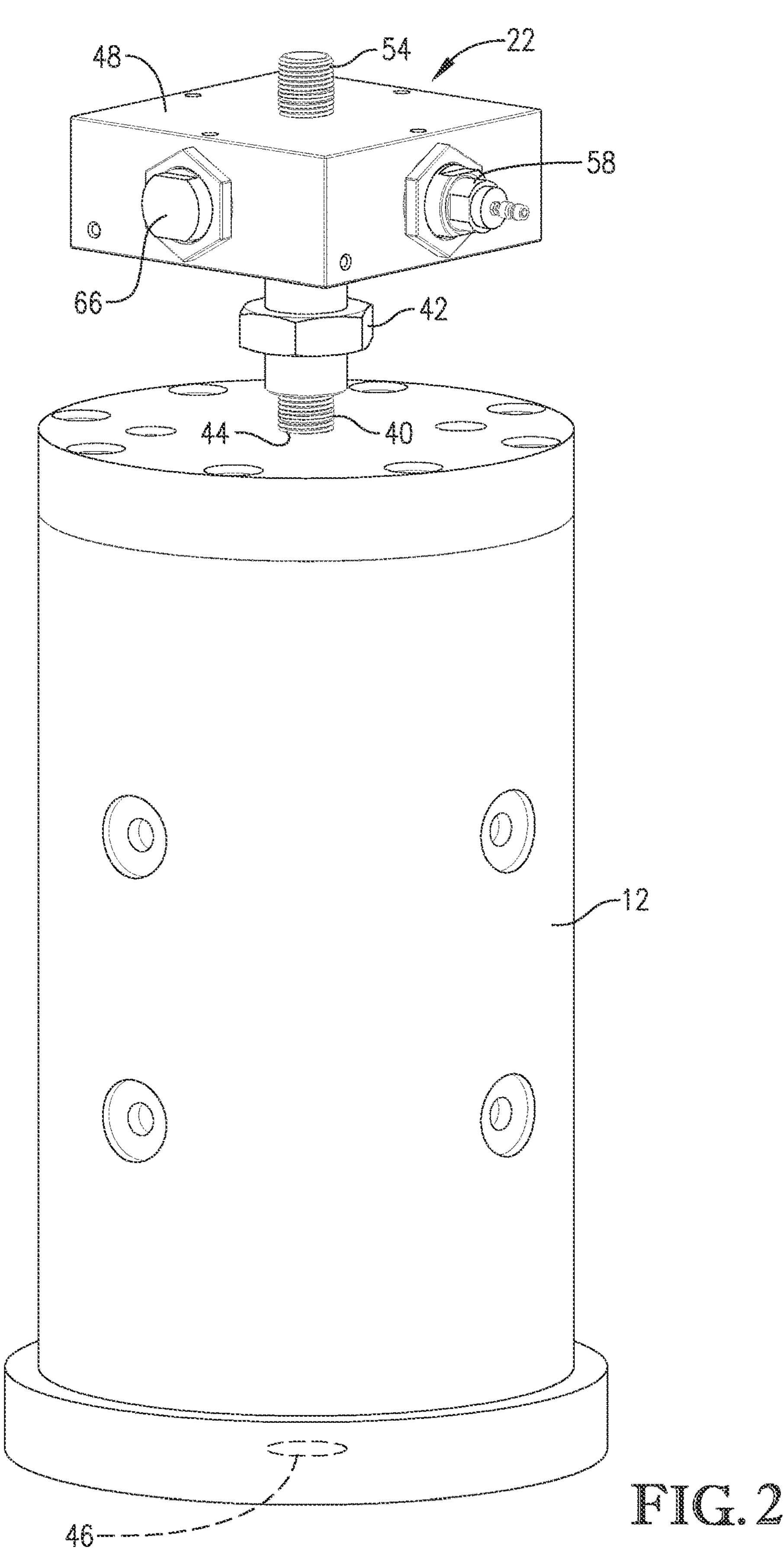
FIG. 2 is an illustration of an exemplary reaction chamber and ignition assembly according to one or more embodiments of the present invention.
Figure 3:
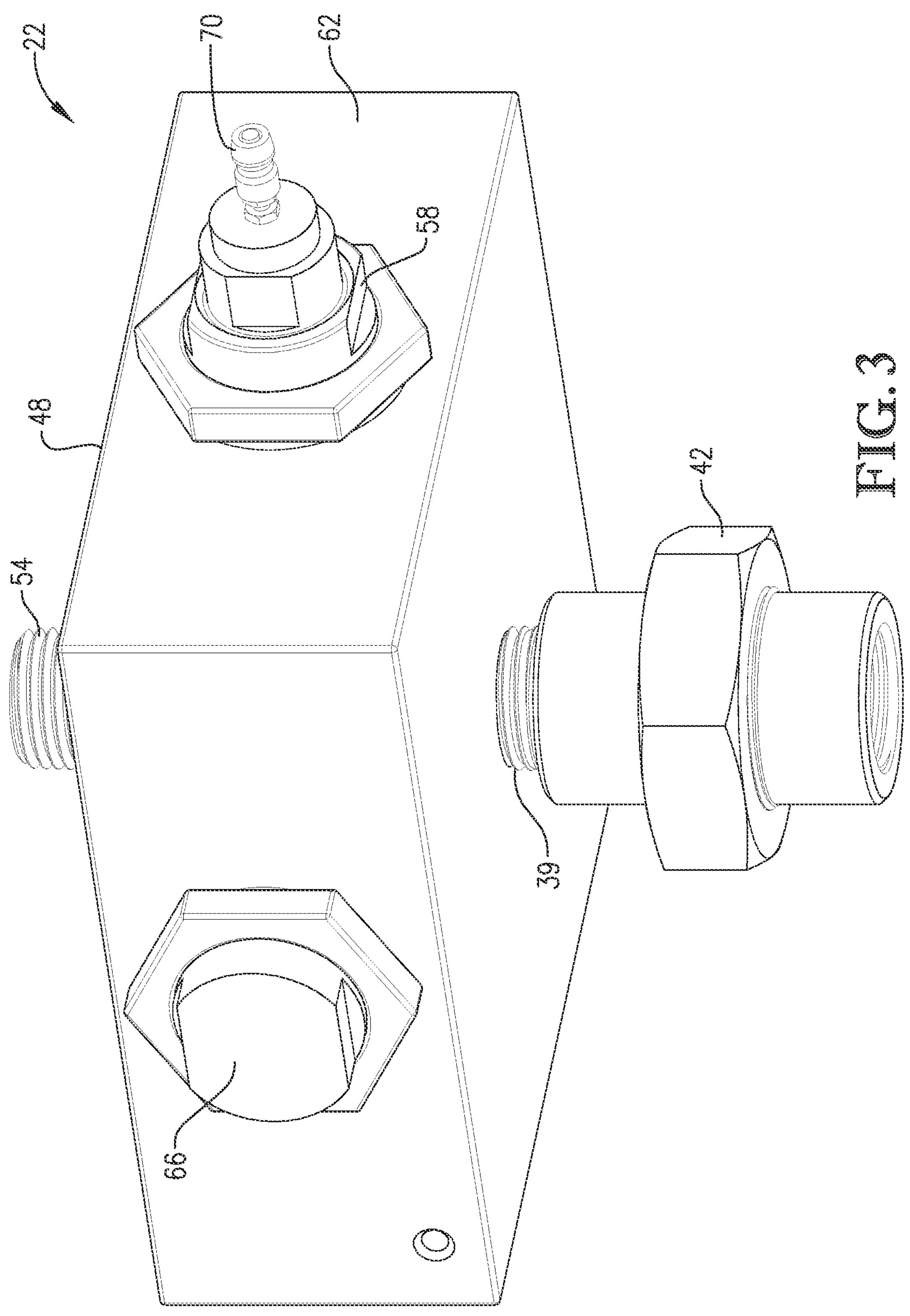
FIG. 3 is a perspective view of the ignition assembly of FIG. 2.
Figure 4:
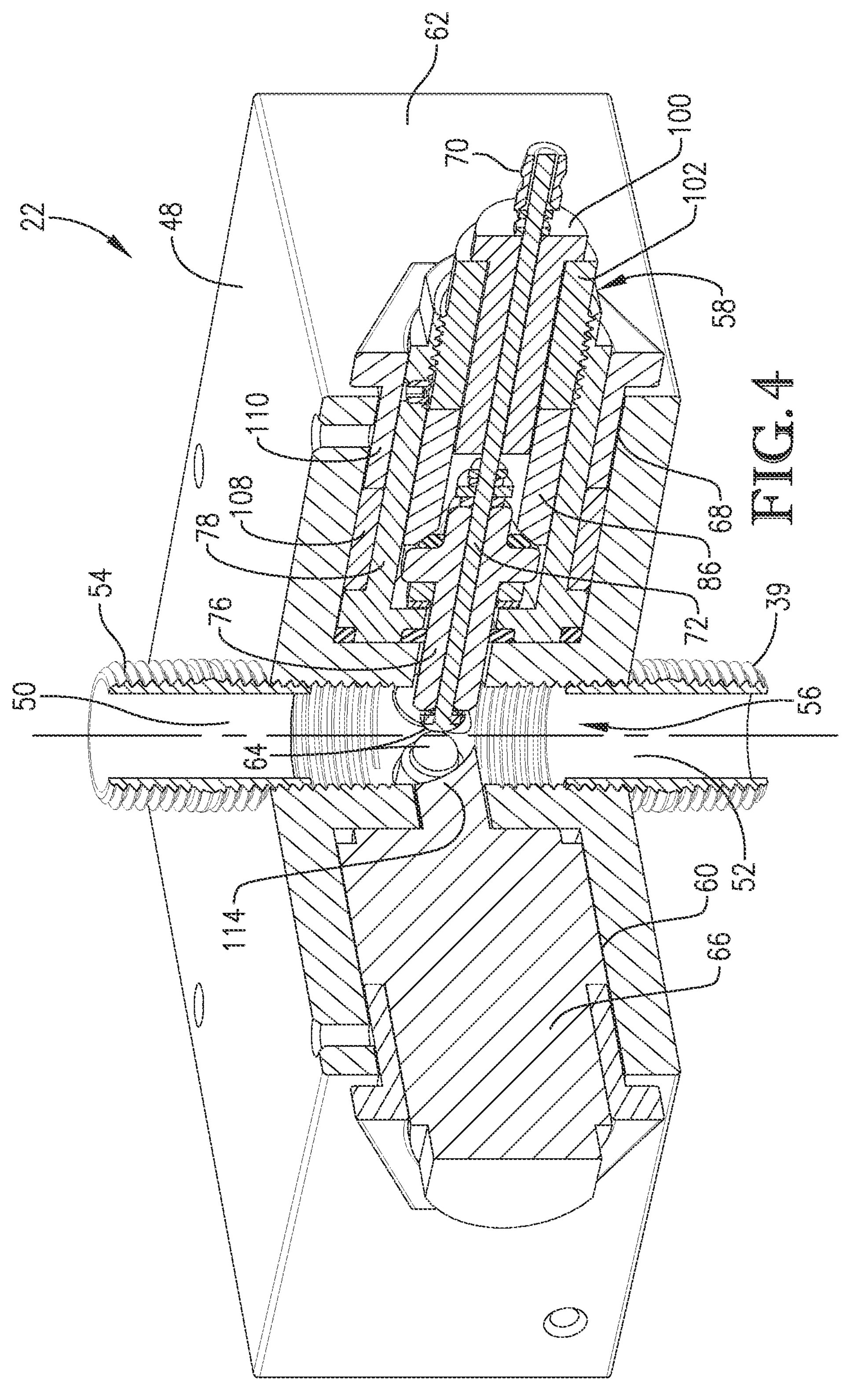
FIG. 4 is a sectioned view of the ignition assembly of FIG. 3.
Figure 5:
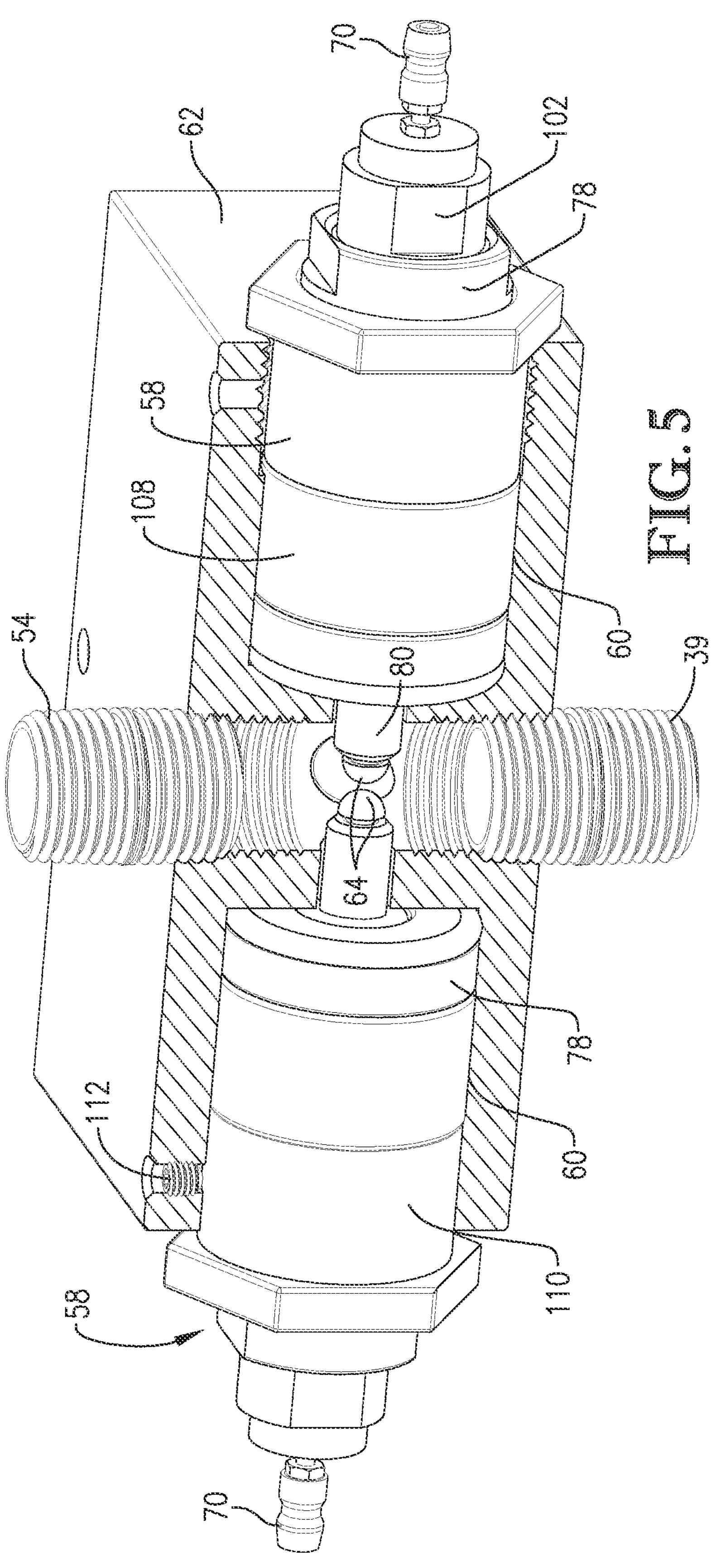
FIG. 5 is a sectioned view of the ignition assembly of FIG. 3 depicting the pair of electrodes carried by the ignition assembly.

FIG. 2 depicts an exemplary reaction chamber 12 coupled with an exemplary ignition assembly 22 by pipe nipples 39, 40 and pipe union 42. In certain embodiments, the ignition assembly 22 can be integrated with reaction chamber 12 rather than provided as separate modules. As illustrated, reaction chamber 12 is generally cylindrical and includes an inlet port 44 configured to introduce the reactants into the reaction chamber 12 and an outlet port 46 through which particulate materials generated within the reaction chamber 12 are removed and transported to the particle collector 20. In certain embodiments, the reaction chamber 12 is constructed to withstand the high temperatures and possible shockwaves that may be generated by combustion of the reactants. Additionally, the reaction chamber 12 may contain catalysts or consumable feedstocks.

FIGS. 3-7 illustrate in greater detail an embodiment of an ignition assembly 22 and its components. As depicted, ignition assembly 22 comprises a housing 48 having an inlet 50 and an outlet 52. Again, however, it is within the scope of the present invention for ignition assembly 22 to be integrated with reaction chamber 12 rather than provided as separate modules. Pipe nipple 54 is threadably received within inlet 50 and couples the inlet with gas manifold 28. Pipe nipple 39 is threadably received within outlet 52. The inlet 50 and outlet 52 are interconnected by a passage 56 that extends through the housing 48. At least one pair of electrode cassettes 58 are removably received within ports 60 that extend through the circumscribing housing sidewall 62. Cassettes 58 preferably are located opposite one another and comprise electrode tips 64 that extend into the passage 56. The distance between electrode tips 64 is referred to as the arc gap. Also located within housing 48 are one or more fluid diverter cartridges 66 that are received within ports 68, which also extend through sidewall 62. In the illustrated embodiment, assembly 22 comprises two opposed fluid diverter cartridges 66 which are oriented at approximately 90° from each electrode cassette 58.

Figure 6:
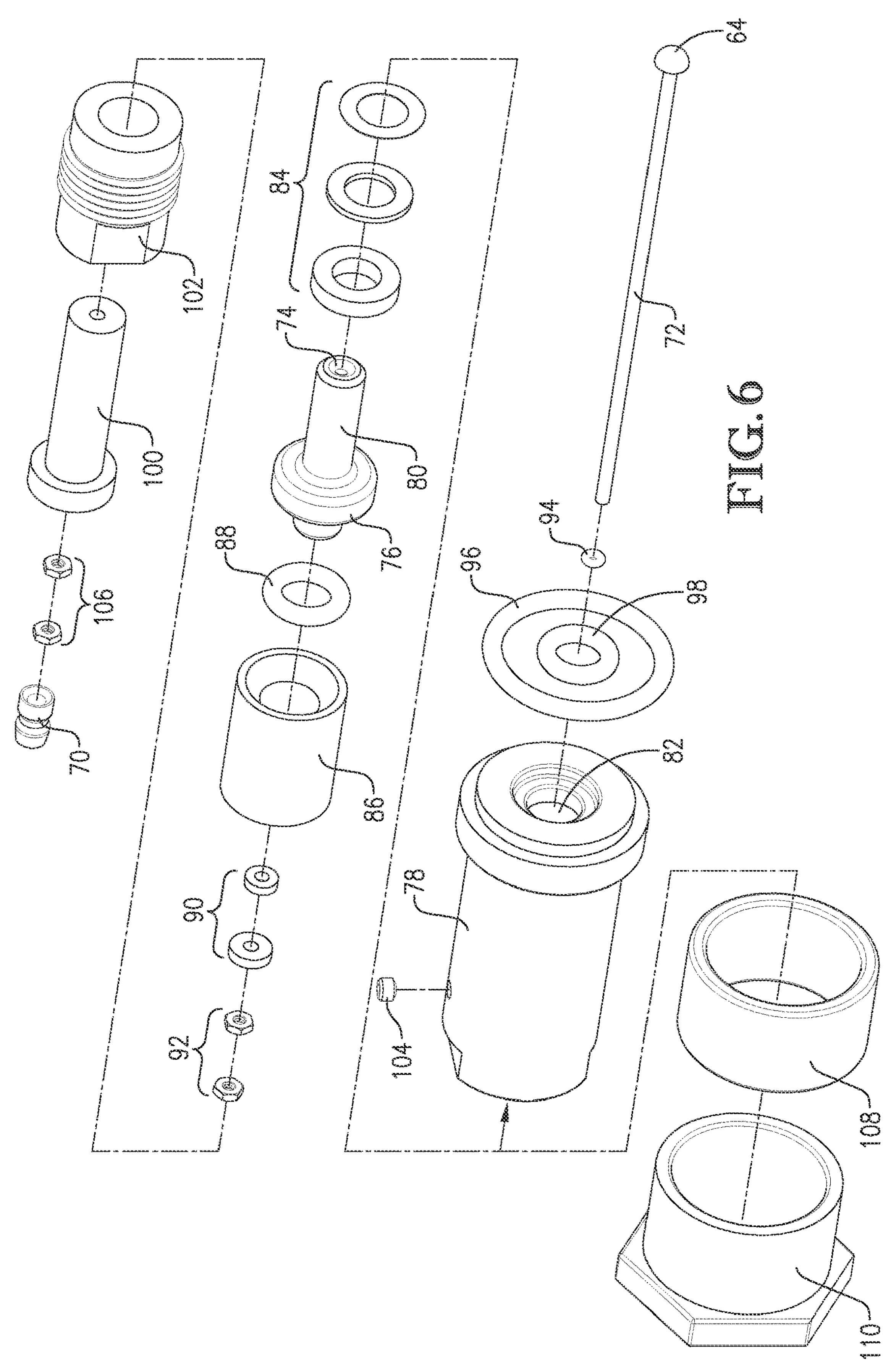
FIG. 6 is an exploded view of an electrode of FIG. 5.

FIG. 6 depicts the construction of an exemplary cassette 58 made in accordance with the present invention. Each cassette 58 comprises an electrical terminal 70 that may be connected to a power source (not shown) capable of supplying the required voltage to generate an ionizing arc between electrode tips 64. Electrode tip 64 comprises the terminus of an elongate electrode 72 that is received within a bore 74 of a body 76. Electrode 72 is preferably a filament or wire, formed from a metal or metal alloy such as copper, gold, silver, aluminum, nickel, iron, platinum, brass or steel. Body 76 comprises an insulative material that electrically isolates electrode 72 from other portions of cassette 58. In one or more embodiments, body 76 is also relatively nonporous and may comprise, for example, glass or glazed ceramic. As explained below, the nonporous nature of body 76 helps retard or prevent penetration of graphene particulates inside cassette 58, which given the high conductivity of graphene, could cause an electrical short within the cassette. In certain embodiments, the insulative material that forms body 76 and isolates electrode 72 may have a porosity of less than 0.1, less than 0.01, or less than 0.001, as determined by any one of several accepted methods of measuring porosity of a material such as a direct volume method, an optical method, an imbibition method, or gas expansion method.

Body 76 is received within a holder 78 with body tubular segment 80 protruding through orifice 82. A plurality of washers or spacers 84 (collectively) are located around tubular segment 80 and within holder 78. A sleeve 86 also surrounds a portion of body 76 and is itself received within holder 78. An O-ring 88 provides a seal between sleeve 86 and body 76. Washers 90 and nuts 92 are threadably received long electrode 72 to maintain sealing pressure and positional security for O-ring 94 and tip 64 against body 76. O-ring 94 provides a seal between electrode tip 64 and body 76. O-rings 96, 98 provide seals between holder 78 and housing 48.

A ferrule 100 surrounds the distal portion of electrode 72 and is received within a collar 102 that is configured to abut sleeve 86. Preferably, ferrule 100 comprises an electrically insulative material, which may be the same or different than that which comprises body 76. Collar 102 is threadably fastened to holder 78 to provide positional security for various components of the electrode assembly. Notably, collar 102 maintains electrode tip 64 in a fixed position within passage 56. A set screw 104 can be used to secure collar 102 and holder 78. Nuts 106 secure ferrule 100 within collar 102. Terminal 70 is connected to the distal end of electrode 72. Bearing 108 and bushing 110 surround respective portions of holder 78, and a set screw 112 can be used to secure bushing 110 within port 60.

The electrode cassettes 58 are also adjustable within their respective ports 60 so that it is possible to set and maintain the desired arc gap even when servicing the ignition assembly 22 and replacing the cassettes.

In certain embodiments, the electrode 72 is configured to be moveable within the ignition assembly. As explained in greater detail below, the ability to move the electrode 72 without entirely removing it from the ignition assembly 22 may assist with cleaning of the electrode tips 64. In one or more embodiments, the electrodes 72 may be rotated by connecting an actuator (not illustrated), such as a servo motor or pneumatic piston, to the electrodes themselves, or to the cassettes 58. The actuator can be operated to rotate or index the electrodes a certain number of degrees following each combustion reaction or following any predetermined number of combustion reactions. In other embodiments, the electrodes 72 may be extended, retracted, and/or rotated within the ignition assembly 22 to provide cleaning or symmetrical wearing of the electrodes.

Figure 7:
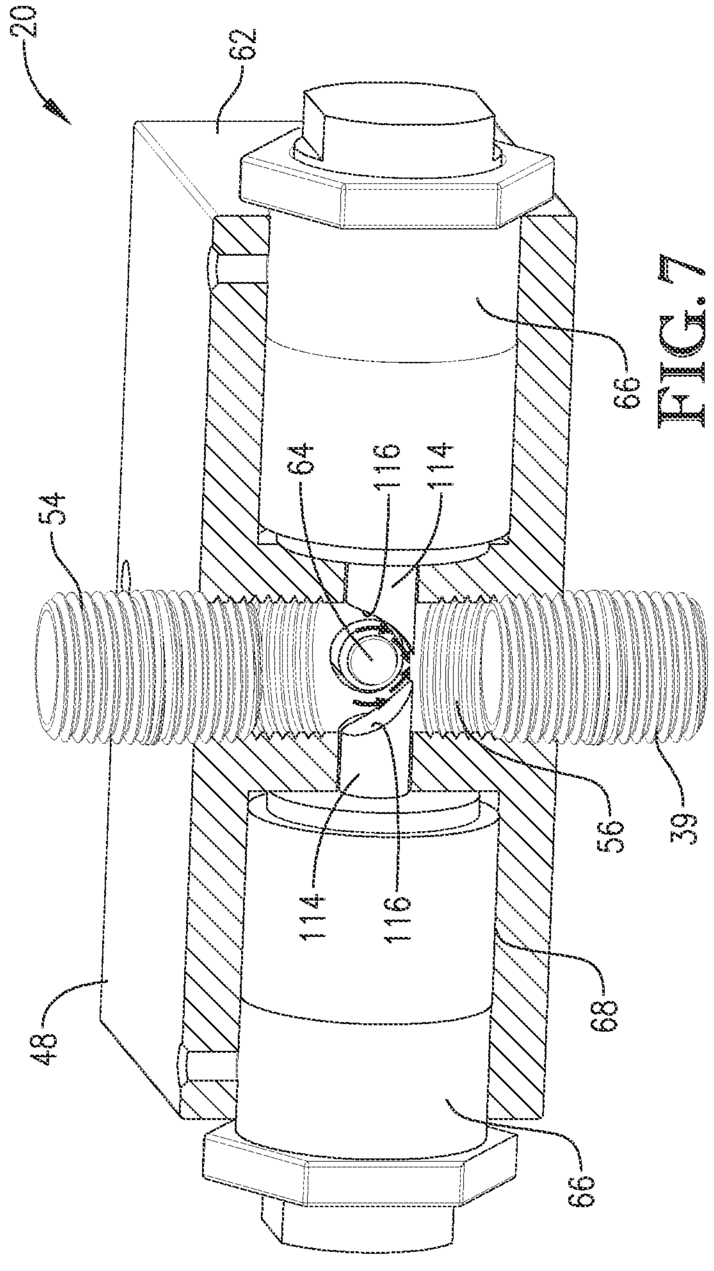
FIG. 7 is a sectioned view of the ignition assembly of FIG. 3 depicting a pair of venturis for directing flow of fluids introduced into the ignition assembly around the electrodes.

In one or more embodiments, as illustrated, the ignition assembly 22 comprises one or more, and preferably two, fluid diverter cartridges 66. As can be seen in FIG. 7, the fluid diverter cartridges 66 comprise venturi structures 114 that extend into passage 56. Venturi structures 114 comprise beveled surfaces 116 that are configured to direct a fluid flowing through passage 56 across a surface the electrode tips 64 that is opposed to the direction of flow of the fluids through the ignition assembly (i.e., a surface of the electrode tips 64 that faces outlet 52). Thus, the venturi structures 114 ensure that a flushing gas flowing through passage 56 contacts substantially the entire surface of electrode tips 64 thereby removing particulates, especially carbonaceous deposits, which have accumulated thereon.

In certain embodiments, the cassettes 58 and/or diverter cartridges 66 are configured to be easily removed from ignition assembly 22 and different cassettes and/or cartridges installed in their places. Thus, servicing ignition assembly 22 can be performed with very little down time of apparatus 10. The self-cleaning action and rapid changing out of cassettes 58 and/or cartridges 66 of ignition assembly 22 are features that greatly contribute to the ability of apparatus 10 to produce commercial-scale quantities of particulate materials.

As discussed above, apparatus 10 can be used in the production of particulate materials, especially graphene particles, through a combustion reaction. The carbon-containing material and oxidizer are charged to the reaction chamber 12 by passing the materials through manifold 28 and through ignition assembly 22. The carbon-containing material and oxidizer may be mixed upstream of or within the manifold 28 and then delivered to reaction chamber 12. The pressure of the reaction mixture within the reaction chamber 12 prior to combustion may be varied to provide control over the reaction conditions and reaction products formed. In certain embodiments, the initial pressure of the reaction mixture within the reaction chamber 12 may be between about 0.1 to about 3 atm, about 0.5 to about 2 atm, or about 1 atm. The vacuum system 14 can be employed to assist with filling of the reaction chamber 12 with the reactants. The vacuum system 14 can be used to evacuate reaction chamber 12 prior to the introduction of the reactants. In certain embodiments, the reaction chamber is evacuated to an absolute pressure of less than 0.2 atm, less than 0.1 atm, or less than 0.05 atm. This evacuation creates a pure environment for the reaction and assists with drawing the reactants into the reaction chamber without otherwise needing to bleed the chamber as reactants are introduced.

Once the desired quantity of carbon-containing material and oxidizer have been loaded into the reaction chamber 12, an ionizing arc is generated between the pair of electrodes 72 within the ignition assembly 22 thereby initiating combustion of the carbon-containing compound and oxidizer. After initiation, the combustion reaction is self-sustaining until the reactants present in the reaction chamber 12 are depleted. It is noted that in preferred embodiments, the combustion reaction is a detonation reaction. However, it is within the scope of the present invention for the combustion reaction to be a deflagration or burning reaction as well. As used herein, "detonation" is distinguished from mere "deflagration" or "burning" of the carbon-containing material. Detonation typically involves a supersonic exothermic front that accelerates through a medium that eventually drives a shock front propagating directly in front of it. Deflagration is typically described as subsonic combustion propagating through heat transfer. Detonation reactions are also generally characterized by the production of higher temperatures in the reactants and reaction products.

In one or more embodiments, the combustion reaction occurs at a temperature of at least 3000 K, at least 3500 K, or at least 4000 K. In particular embodiments, the combustion reaction occurs at a temperature of between about 3000 K to about 5000 K, between about 3500 K to about 4500K, or about 4000 K. It has been discovered that the combustion of the carbon-containing materials and oxidizer at these temperatures favors the formation of highly ordered graphene particulates as opposed to graphitic soot. Inert gaseous materials such as helium, neon, argon, or nitrogen can be included in the reaction mixture charged into the reaction vessel to assist with temperature control during combustion, if necessary. Also, in certain embodiments, especially in embodiments in which the combustion reaction is a detonation, the combustion of the reaction mixture proceeds very quickly. In certain embodiments, the combustion has a duration of between about 5 to about 100 ms, between about 10 to about 75 ms, or between about 20 to about 50 ms.

In certain embodiments, the particulate materials (e.g., graphene particulates) produced by the combustion reaction are dispersed within the reaction chamber 12 in the form of an aerosol. The particulate materials may tend to aggregate immediately upon formation into particles having an average size of between about 35 to about 250 nm, between about 50 to about 200 nm, or between about 75 to about 150 nm. In some embodiments, if the aggregation of the particles were permitted to continue under quiescent conditions, the particles could aggregate to form a gel. The conditions and requirements for aggregation of particulate materials into solid aerosol gels are described in U.S. Pat. No. 7,691,909, incorporated by reference herein in its entirety. In order to form a gel, the particles typically must be left within the reaction chamber and substantially undisturbed for a significant period of time. In one or more embodiments, it is desirable to remove the particles from the reaction vessel prior to the particles being able to aggregate sufficiently and form an aerosol gel. Thus, in certain embodiments of the present invention, the removal of particles from the reaction vessel occurs while the particles remain dispersed as an aerosol, and formation of a gel is avoided.

Because the particulate materials produced during the reaction are generally very fine, they will tend to form a coating upon the apparatus surfaces, and in particular, the electrodes 72, which may lead to fouling. However, in one or more embodiments the electrode cassettes 58 are configured to withstand the pressures generated within the apparatus 10 during the combustion reaction and prevent infiltration of the fine particulates so that an electrically isolated system can be maintained. As described above, embedding the electrode 72 in a non-porous material prevents the particulates from working their way into the cassettes 58 in such a way that creates a short hazard. The electrode 72 may also be configured to shed pressure coated graphene.

As illustrated in FIG. 1, the vacuum system 14 may be used to evacuate the aerosol from the reaction chamber 12 and into particle collector 20. In one or more embodiments, particle collector 20 can be any conventional device for separating fine particulates from a gaseous stream. For example, particle collector 20 may comprise any kind of dust collection apparatus such as an inertial separator (e.g., a settling chamber, a baffle chamber, or centrifugal collector such as a cyclone), a fabric filter device such as a baghouse, a wet scrubber, or an electrostatic precipitator. The particulate material, especially graphene particles, can then be removed from particle collector as a powder.

It is within the scope of the present invention for particle collector 20 to be operably connected to a plurality of reaction chambers 12 in parallel. The reaction cycles within each reaction chamber 12 can be offset to ensure continuous production of particulate materials and continuous collection of those materials within particle collector 20.

During evacuation of the aerosol from the reaction chamber 12, a cleaning or flushing operation can be performed in order to remove carbon deposits from the internal surfaces of the ignition assembly 22, and in particular, from the electrode tips 64. The flows of carbon-containing material from source 24 and oxidizer from source 26 to manifold 28 are stopped, and a flow of flushing gas from source 30 can begin. Alternatively, in embodiments in which no separate flushing gas is provided, the flow of carbon-containing material from source 24 is stopped, but the flow of oxidizer from source 26, which now functions as a flushing gas, is continued.

The flushing gas is directed through manifold 28 toward ignition assembly 22 and reaction chamber 12. As the flushing gas flows through ignition assembly, it operates to remove carbonaceous particulates, especially graphene particulates, that may have become deposited on the surface of the electrode tips 64 resulting from the generation of the graphene aerosol within the reaction chamber 12 and passage 56. The flushing gas resuspends the accumulated particulates and carries them through the reaction chamber 12 and into particle collector 20. In certain embodiments, vacuum conditions are maintained within the reaction chamber 12 by vacuum system 14 to draw the resuspended graphene particulates away from ignition assembly 22 and into particle collector 20.

As described previously and as illustrated in FIG. 7, fluid diverter cartridges 66 alter the flow of flushing gas through passage 56 thereby causing the flushing gas to flow across the surfaces of electrode tips 64 that are opposed to the normal direction of flow through the ignition assembly 22. In this embodiment, if diverter cartridges 66 were not present, the surface of the electrode tips 64 that face the normal direction of fluid flow through ignition assembly 22 would effectively shield the opposed surface creating a dead space in which graphene particulates could accumulate and remain undisturbed. However, the beveled surfaces 116 of venturi structures 114 direct the flushing gas into these would be dead spaces and across the surfaces of electrode tips 64 that face the ignition assembly outlet 52.

Also as described above, as an alternative to or in conjunction diverter cartridges 66, the electrode cassettes 58 can be configured to rotate so that the surface of electrode tips 64 facing outlet 52 changes periodically. In so doing, the ability of graphene particulates to accumulate on any portion of the surface of the electrode tip 64 is greatly diminished.

In certain embodiments, as the flushing gas is being passed through ignition assembly 22, an ionizing arc can be generated between the pair of electrode tips 64. The generation of the arc, or a plurality of successive arcs, in the presence of the flushing gas and the resuspended carbonaceous material can cause the carbonaceous material to gasify, further ensuring the transport of these materials away from the ignition assembly 22. In addition, the generation of one or more ionizing arcs during the electrode cleaning process can be monitored by one or more sensors. The detection of the arc during this process should give high confidence that upon reloading of the reaction chamber 12 with the carbon-containing material and oxidizer, that the next particle-forming reaction will be successful.

Following the cleaning operation in which flushing gas is passed through the ignition assembly 22, the reaction chamber 12 can be isolated from the vacuum system 14 and additional carbon-containing material and oxidizer can be introduced into the reaction chamber 12. The reaction chamber is now loaded with reactants and ready for the ignition assembly 22 to initiate combustion of the reactants and generate further quantities of particulate materials, especially graphene particulates. The foregoing steps can be repeated a plurality of times. It is noted that in certain embodiments the cleaning operation described above need not be performed after every combustion reaction occurring within reaction chamber 12. In such embodiments, a predetermined number of combustion and aerosol evacuation cycles may be performed prior to initiating a cleaning cycle with the flushing gas.

The following description provides an example of one mode of operation of apparatus 10. At t=0, the gas manifold 28 and reaction chamber 12 are at a pressure of 1 atm and the particle collector 20 and vacuum ballast tank 18 have been evacuated and are at a pressure of approximately 0.1 atm. Valves 38*c* and 38*e* are opened, and valve 38*b* is set to draw a vacuum on reaction chamber 12. Due to the large vacuum reservoir in the vacuum ballast system, opening valve 38*e* rapidly draws the pressure in the gas manifold 28 and reaction chamber 12 to approximately ⅓ atm, which causes valve 38*e* to close. The reaction chamber 12 and manifold 28 continue to draw down through valves 38*b* and 38*c* until the gas manifold 28 and reaction chamber 12 reach approximately 0.1 atm. At t=0.5 to 5 seconds, valve 38*b* switches to drawing on ballast tank 18 and the mass meters 34, 36 begin to accurately dispense the reactant materials into the reaction chamber 12 at programed rates and concentrations. The dispensed volume is calculated to fill the reaction chamber back to 1 atm in typically 15 to 50 seconds. Once all reactants are dispensed, valves 38*a* and 38*c* close while valve 38*d* opens as a safety pressure release. The control system then can wait a programmed delay, typically 1 second, before the ignition assembly 22 initiates the reaction. After the control system detects a successful reaction and after an optional programmed delay, typically 0 seconds, but possibly 1 or 2 seconds, valve 38*e* opens to begin the collection process by rapidly pulling the reaction chamber back to approximately ⅓ atm. Moments later, valve 38*c* opens, thereby venting the reaction chamber 12 to 1 atm through the already open valve 38*d*. This introduces a high-speed airflow through the gas manifold 28 and into the reaction chamber 12. This airflow pushes the graphene aerosol from the reaction chamber 12 into the particle collector 20 where it is collected, for example, in a specially modified industrial bag filter. Simultaneously, the high-speed airflow pushes past the ignition system electrodes 72 (and electrode tips 64) and, in combination with a special sparking sequence, provides effective cleaning of the electrodes, thereby preparing them for the next reaction. This programmable collection/cleaning period typically lasts 5 to 20 seconds after which, the ignition assembly 22 is off, valve 38*d* closes, valve 38*a* opens and valve 38*b* switches vacuum pump 16 toward manifold 28, and with valve 38*c* open and valve 38*d* closed, the reaction chamber 12 is rapidly drawn back to approximately ⅓ atm, and the cycle repeats. In certain embodiments, the time required to complete one cycle is less than 120 seconds, and preferably from about 20 to about 100 seconds, from about 30 to about 90 seconds, or from about 35 to about 75 seconds.

We claim:

1. Apparatus for production of particulate materials through combustion of reactants comprising:

- a reaction chamber operably coupled with a source of a carbon-containing material and a source of an oxidizer;
- a vacuum source operably connected with the reaction chamber and operable to selectively evacuate at least a portion of the contents of the reaction chamber; and
- an ignition assembly configured to initiate combustion of a quantity of the carbon-containing material and a quantity of the oxidizer delivered to the reaction chamber from their respective sources,
- the ignition assembly comprising a pair of electrodes that are operable to generate an ionizing arc therebetween, each electrode being contained within a respective cassette that is removably received within the ignition assembly; and
- one or more fluid diverters configured to direct, or disturb, at least a portion of a fluid flowing through the ignition assembly across a surface of one or both of the pair of electrodes.

2. The apparatus of claim 1, wherein the ignition assembly comprises a housing having an inlet port configured to be fluidly connected to the source of carbon-containing materials and to the source of the oxidizer, the housing also having an outlet port configured to be fluidly connected to the reaction chamber, the inlet port and outlet port being connected by a passage through the housing.

3. The apparatus of claim 1, wherein the one or more fluid diverters comprise one or more venturis that have a beveled surface that projects into the passage.

4. The apparatus of claim 1, wherein the apparatus is operably coupled with a source of a flushing gas, the apparatus being configured to direct the flushing gas through the ignition assembly to remove carbon and/or carbon-containing compounds deposited on the electrodes resulting from the combustion of the carbon-containing material and oxidizer.

5. The apparatus of claim 1, wherein the electrodes are selectively rotatable within the ignition assembly.

6. The apparatus of claim 1, wherein the electrodes comprise a non-porous material surrounding an electrical conductor, the electrical conductor comprising an electrode tip that protrudes through the non-porous material and into a passage within the ignition assembly.

7. The apparatus of claim 6, wherein the non-porous material comprises a glass or a glazed ceramic.

8. The apparatus of claim 1, wherein the vacuum source comprises a vacuum pump and ballast tank.

* * * * *